United States Patent

[11] 3,577,811

| [72] | Inventor | Ambrose D. Walker |
| | | Clinton, Mo. |
| [21] | Appl. No. | 783,338 |
| [22] | Filed | Dec. 12, 1968 |
| [45] | Patented | May 4, 1971 |
| [73] | Assignee | Leo X. O'Brien |
| | | Independence, Mo. |
| | | a fractional interest to each |

[54] DEVICE FOR RETENSIONING EYEGLASS FRAMES
8 Claims, 3 Drawing Figs.

| [52] | U.S. Cl. | 81/3.5, 269/237, 269/289 |
| [51] | Int. Cl. | B25b 11/00 |
| [50] | Field of Search | 81/3.5; 269/237, 289 |

[56] References Cited
UNITED STATES PATENTS

| 1,444,124 | 2/1923 | Jaffe et al. | 81/3.5 |
| 3,269,224 | 8/1966 | Magee | 81/3.5 |

*Primary Examiner*—Travis S. McGehee
*Attorney*—Scofield, Kokjer, Scofield and Lowe

ABSTRACT: This invention has to do with a retensioning device for eyeglass frames and is adaptive for use on different sized frames. The retensioner employs a pressure lever pivoted centrally upon its base remote from the nosepiece of the glasses to permit the free end of the pressure lever to nest in the nosepiece curvature, and a tensioning assembly for manually imposing and maintaining for desired intervals an adjusted downward pressure on the nosepiece and frame.

Patented May 4, 1971 3,577,811

INVENTOR
Ambrose D. Walker

BY
ATTORNEYS

DEVICE FOR RETENSIONING EYEGLASS FRAMES

BACKGROUND OF THE INVENTION

With constant use, eyeglasses, held in place by bows which hook over the ears and are adjusted to cling or grip the sides of the head, lose their resiliency and fit across the front of the face, not only due to the spreading of the bows but often the misshaping of the nosepiece curvature. These maladjustments result in displacement of the glasses frame before the eyes and a tendency of the glasses to slide along the bridge of the nose, destroying proper focus of the lenses.

To maintain a proper adjustment of the bows and frame so the desired gripping tension is imposed on the sides of the head, to keep the right curvature in the nosepiece and the prescribed angle of the lenses before the eyes are all features which govern a proper fit and adjustment of the glasses to the wearer. Since maladjustments take place gradually and remain unnoticed until poor sight may result, little attention is given to repairing these faults.

In the use of safety glasses usually having plastic frames where intense heat is experienced, as in milling operations, distortion of the frames and bows as well as the nosepiece is greatly exaggerated. To minimize these difficulties and keep the frames in proper adjustment as well as reestablishing the original curvature of both the frame and nosepiece, the retensioner maintains a slightly warped condition to the frames while stored between wearings.

An investigation of related devices which have preceded reveals various types of glasses holders with clamps usually applied to the nosepiece to hold them in their cases. Among these are the U.S. Pats. to Bemis, No. 608,640; Duncanson, No. 1,393,511; Davis, No. 2,692,043; Shiner, No. 2,863,487 and Abbott, No. 2,927,685. None of these references feature the basic concept herein disclosed, namely the idea of supporting an eyeglass frame at its outer edges and applying downward pressure upon the nosepiece for the purpose of retensioning the frame.

In the accompanying drawings which form a part of the specification and are to be read in conjunction therewith, and in which like reference numerals are used to indicate like parts in the various views, there is shown an embodiment of the invention.

DESCRIPTION OF THE INVENTION

Figure 1:
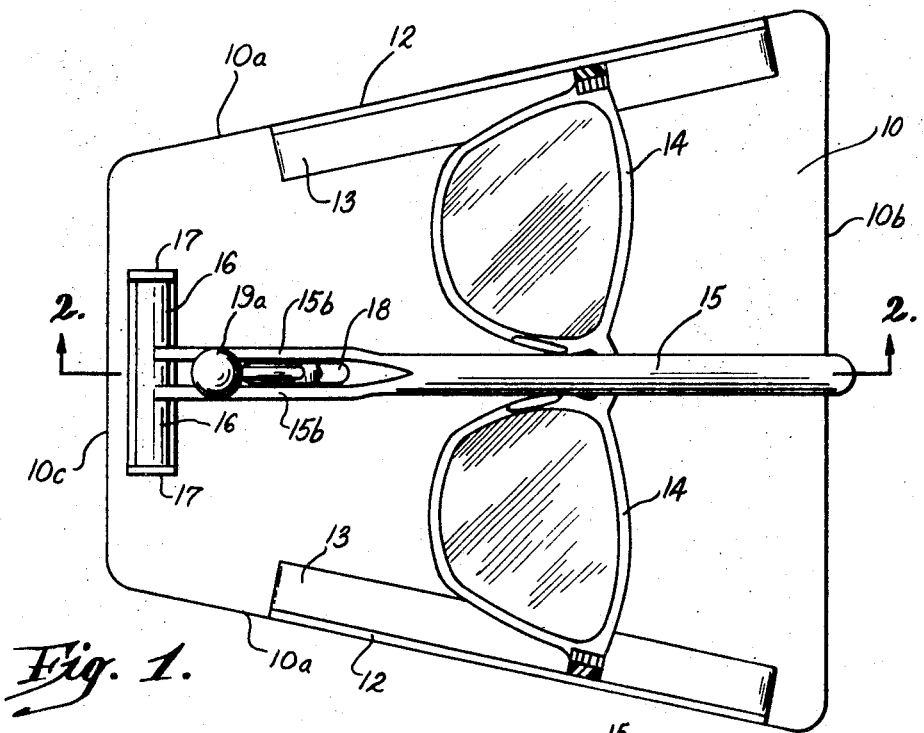
FIG. 1 is a plan view of the retensioner.

Referring to the drawings, at 10 is shown a flat platelike base made of metal, wood or plastic, supported on legs 11. Vertical side strips or panels 12 extend along portion of the sides 10a, which are angled with respect to the parallel sides 10b and 10c. Within the side panels 12 and above the top surface of the base are frame support ledges or shelves 13. The purpose of angling the sides of the base 10, lateral panels 12 and shelves 13, is to furnish supports and limiting elements for any size glasses frames, a typical size shown at 14 in FIG. 1. A narrower frame would slide further along the shelves or ledges to a position closer to the narrow end of the base 10a before limited by the angled side panels 12, while a wider frame would be stopped close to the wide end 10b in order to be positioned for retensioning. Both the top of the base and the supporting surfaces of the shelves or ledges are surfaced with felt or like soft material to protect the frames and lenses from possible scratching or abrasion during retensioning.

Figure 2:
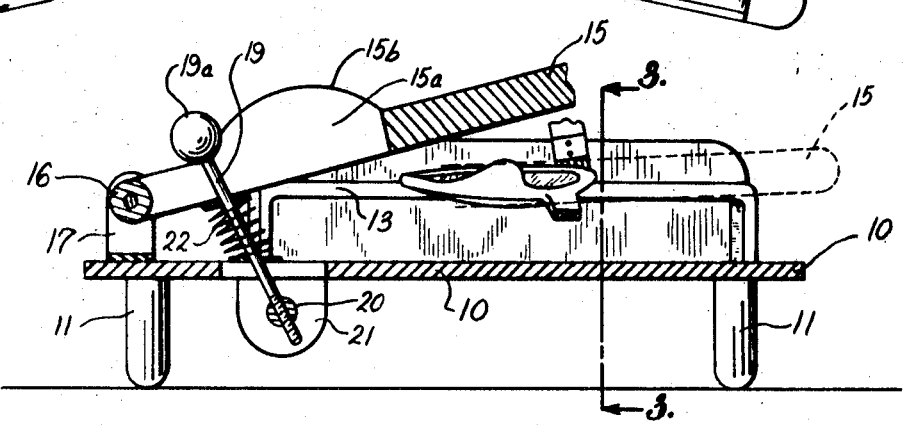
FIG. 2 is a vertical section taken along the line 2—2 in FIG. 1 in the direction of the arrows.
Figure 3:
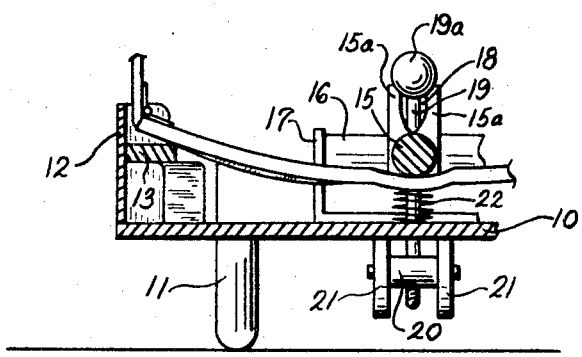
FIG. 3 is a vertical section taken along the line 3—3 in FIG. 2 in the direction of the arrows.

The assembly for imposing retensioning pressure on the frame comprises a cylindrical lever 15 attached to a short shaft or axle 16, which in turn bears in uprights 17 mounted centrally of the base adjacent its short side 10c. The lever 15 is bifurcated near its pivoted end to form an elongated slot 18. That portion of the lever forming the sides of the slot is drawn out to form two platelike elements 15a, shown in FIGS. 1 and 3, the tops of the plates rounded to form camming surfaces 15b, best shown in FIG. 2.

A cam rod 19 with a ball-shaped head 19a is pivoted in cross shaft 20, the latter rotatively mounted in lugs 21 depending beneath the baseplate 10. Cam rod 19 extends upwardly through a slotted hole in base 10 and slot 18 in lever 15 so ball-shaped head 19a is held against camming surfaces 15b by the action of coil spring 22. The lower end of cam rod 19 is screw threaded into cross-shaft 20 offering elongation or shortening of the cam rod in order to vary the pressure imposed on lever 15.

To retension, straighten or reestablish the proper curvatures to a glasses frame, the glasses are placed on support ledges 13 of the base and slid along these supports until stopped by contact of their outer extremities with panels 12, as shown in FIG. 1. During the positioning of the glasses on the ledges the free end of lever 15 is raised to the full line position shown in FIG. 2 with the ball head 19a of camming rod retracted from cams 15b. When the glasses are properly located as shown in FIG. 1, pressure lever 15 is lowered to nest in the curvature or arch of the nosepiece. The cam rod is then adjusted to a proper length so shifting of the ball head 19a onto cam surfaces 15b will impose the desired downward pressure upon lever 15 and arch of the nosepiece. Normally sufficient pressure is imposed and maintained to reestablish the frame curvature's profile, contours and angularities and shape the glasses as when originally fitted. If kept periodically in a retensioner such as this the original frame shape is easily and permanently maintained.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A frame retensioner for glasses comprising:
   a base having lateral supports for the outer or side extremities of the frames,
   a pressure lever pivoted centrally of the base remote from the nosepiece of the frames, said lever having a free end extended over said frames and adapted to nest in the curvature of the nosepiece,
   a manually adjustable tensioning assembly connected between the base and the pressure lever for (1) imposing and maintaining, via said lever, a pressure upon the nosepiece and frame elements and (2) for adjustably varying said pressure.

2. A frame retensioner for glasses as in claim 1, wherein the lateral supports include ledges inclined toward convergence to the pivoted end of said lever in order to accommodate different sized frames.

3. A frame retensioner as in claim 1, wherein said tensioning assembly comprises a rod pivoted in the base having an enlarged head, said head adapted to be moved along a camming surface formed in the pressure lever to impose adjusted variable pressures upon the nosepiece of the frames.

4. A frame retensioner as in claim 3, including means at the pivot of the rod for lengthening or shortening the rod.

5. A frame retensioner as in claim 3, wherein the pivoted rod extends through a longitudinal slot in the pressure lever permitting the lower surface of the head to move along the camming surface of the pressure lever for raising and lowering the free end of the lever.

6. A frame retensioner as in claim 3, including a compression spring surrounding the pivoted rod between the base and the pressure lever.

7. A frame retensioner as in claim 1, wherein said tensioning assembly comprises an adjustable rod threadably received in the base and having an enlarged head adapted to engage said pressure lever to impose adjusted variable pressures on the nosepiece of the frames.

8. A frame retensioner as in claim 7, including a compression spring surrounding said rod between the base and the pressure lever.